(12) United States Patent
Gao

(10) Patent No.: US 8,581,535 B2
(45) Date of Patent: Nov. 12, 2013

(54) DRIVE UNIT

(75) Inventor: Yang Gao, Shanghai (CN)

(73) Assignee: ABB Technology Ltd, Zürich (CH)

( * ) Notice: Subject to any disclaimer, the term of this patent is extended or adjusted under 35 U.S.C. 154(b) by 487 days.

(21) Appl. No.: 12/308,443

(22) PCT Filed: Aug. 26, 2008

(86) PCT No.: PCT/EP2008/061107
§ 371 (c)(1),
(2), (4) Date: Aug. 16, 2010

(87) PCT Pub. No.: WO2010/022765
PCT Pub. Date: Mar. 4, 2010

(65) Prior Publication Data
US 2011/0127935 A1  Jun. 2, 2011

(51) Int. Cl.
*H02P 27/00* (2006.01)

(52) U.S. Cl.
USPC .......................... 318/400.3; 318/375; 318/801

(58) Field of Classification Search
USPC .............. 318/400.3, 375, 801, 376, 378, 812, 318/800, 381, 759, 762, 781, 787
See application file for complete search history.

(56) References Cited

U.S. PATENT DOCUMENTS 8,237,088 B2 * 8/2012 Yokota et al. ............ 219/130.51
2004/0160792 A1 * 8/2004 Youm et al. ..................... 363/37

FOREIGN PATENT DOCUMENTS

| DE | 101 16 011 | 5/2002 |
| JP | 03-289362 | 12/1991 |
| JP | 04-017572 | 1/1992 |
| JP | 07-099784 | 4/1995 |

* cited by examiner

*Primary Examiner* — Karen Masih
(74) *Attorney, Agent, or Firm* — Dilworth & Barrese, LLP.

(57) ABSTRACT

A drive unit has a control power supply, a power source (1) producing direct current to one or more inverters (2), an energy storage (C) arranged at the power source (1) output, and a discharge circuit (8,10) for discharging the energy stored in the energy storage (C) and including a power resistor (8). Switches (5, 6) are arranged between the power source (1) and energy storage (C) and in default position when there is no control power in the drive unit. The power source (1) is disconnected and the energy storage (C) discharged through the power resistor (8) when the switches (5, 6) are in default position.

12 Claims, 3 Drawing Sheets

DRIVE UNIT

FIELD OF THE INVENTION

The present invention relates to a drive unit for an electric motor comprising a power source producing direct current to one or more inverters, at least one inverter producing current to the motor, an energy storage arranged at an output of the power source for smoothing direct current and storing energy recovered during braking of the motor and a discharge circuit including a power resistor for discharging the energy stored in the energy storage if the voltage across the energy storage becomes too high.

The invention is, for example, useful in a drive unit of an industrial robot, an AC servo drive, a servo motor inverter, and a high voltage AC/DC power source.

PRIOR ART

A robot drive system includes a plurality of drive units. A robot drive unit includes a rectifier for converting alternating current (AC) into direct current (DC), a frequency inverter, and a DC bus connected between the rectifier and the inverter. The frequency converter converts the DC current to a variable alternating current in dependence on reference values generated based on a robot control program. The variable alternating current from the frequency converter is then supplied to the motor.

In a motor drive unit there is normally a power resistor, for example a large bleeder resistor, arranged in the DC bus in order to take care of energy generated in the motor when the speed of the motor is reduced. Further, the DC bus is also normally provided with a capacitor with a high capacitance, which must be charged with a limited current upon start-up of the drive unit. This is, for example, the case in a drive unit for an industrial robot. When the motors of the robot are electrically braked, energy from the motors are recovered and fed back to the capacitor. If this energy is not consumed in another motor, the voltage across the capacitor is increased. In order to protect the capacitor and other components, it is necessary to discharge the capacitor if the voltage across the capacitor becomes too high. Therefore, the voltage across the capacitor is supervised, and if the voltage rises above a limit value, the bleeder resistor is connected to the capacitor so that the resistor discharges energy of the capacitor. When the voltage across the capacitor is below a limit value the power resistor is disconnected.

The high DC bus working voltage makes it necessary to discharge the DC bus quickly when the robot control is disabled. The quick discharging of the DC bus must be achieved even when the robot loses control power by accident. Charging and discharging of the DC bus need to be taken care of specially to avoid high current, or too long time to load and unload the capacitors of the DC bus. Using a separate power resistor to discharge the DC bus will add costs and size to the drive unit. The discharge time will be too long with a common choice of small resistors with high resistance.

A problem upon start-up of the drive unit is that a large inrush current is generated when the power supply is turned on. In order to protect the capacitor bank and the electronics connected to the DC output, the inrush current must be limited. To prevent the drive unit from high inrush currents, it is required to have some kind of charge circuit for the energy storage, or a current limiting circuit for the input current. Examples of traditional solutions are a switch regulator, a serial resistor, or a serial inductor on the AC main supply of the rectifier.

The patent application PCT/EP2007/060452 (not published at the date of filing of the present application) proposes a more cost-effective solution for limiting the inrush current in a drive unit for an electric motor. The disclosed drive unit comprises a power source producing direct current to the motor, a capacitor arranged at an output of the power source for storing energy recovered during braking of the motor, and a discharge circuit for discharging the energy stored in the capacitor if the voltage across the capacitor becomes too high. The discharge circuit includes a bleeder resistor arranged to discharge the energy stored in the capacitor. The drive unit is adapted, during start-up of the drive unit, to lead an inrush current, generated during start-up of the drive unit, through the resistor of the discharge circuit, and during normal operation to discharge the capacitor by means of the same resistor when the voltage across the capacitor becomes too high. The same resistor is used to take care of the inrush current during start-up of the drive unit, and to discharge the capacitor when the voltage across the capacitor becomes too high during normal operation. Such a drive unit requires fewer components than the traditional solutions, and accordingly provides lower costs, higher reliability and less space consumption.

The disclosed drive unit will still have a high voltage quite a long time after the power supply has been stopped because of the DC-bus capacitor. There is going to take up to several hours before the capacitor has been discharged, and thereby the voltage has dropped to a low level, without any extra discharging circuit. This can not be allowed, because the high voltage and the energy stored in the capacitor can injure people, such as service people and workers who want to work around the drive unit when they believe it has been stopped. But an extra discharging circuit means extra costs and space and might not be very efficient.

OBJECTS AND SUMMARY OF THE INVENTION

The object of the present invention is to provide an improved drive unit, and in particular a drive unit in which the voltage quickly drops to a low level after the drive unit has been turned off, on purpose or by accident, in order to prevent people from getting injured.

This object is achieved by a drive unit as defined in claim 1.

Such a drive unit is characterized in that the drive unit further comprises a first and a second switch arranged between the power source and the energy storage, and the switches are arranged such that they are in default positions when there is no control power in the drive unit, and the drive unit is arranged such that the power source is disconnected from the motor and the energy storage is discharged via said power resistor when the switches are in their default positions.

The invention is particularly useful for drive units having high-voltage power sources. The power source is, for example, a rectifier converting alternating current to direct current. However, the power source can also be a battery or a DC generator. The magnitude of the power produced by the power source is, for example, in the order of 200-800V.

By the term "control power" is meant the power supply to the electronic components in the drive unit, such as transistors, diodes, relays, IGBT, gate driver etc. The control power may vary between 15 and 20V and is typically 18V.

According to the invention, the same power resistor that is used for discharging the energy storage if the voltage across the energy storage becomes too high during operation of the drive unit, is used for discharging the capacitor when control power is lost or turned off. Two switches are used to control the charge and discharge of the energy storage of the drive unit, together with the power resistor of the discharge circuit. The two switches automatically switch back to their default positions when the control power in the drive unit is taken away, on purpose or by accident, and the drive unit is arranged such that the energy storage is discharged via the power resistor of the discharge circuit when the switches are in their default positions. The present invention enables the capacitor to be discharged quickly, such as within 5 seconds, even in a worst case when the control power is lost by accident. A further advantage of the present invention is that no separate power resistor is needed to discharge the capacitor after control power has been removed and operation of the drive unit has been stopped. This saves costs and size since the power resistor has to be large in order to make the charge and discharge time short.

Further, the power supply to the motor is automatically turned off when the control power in the drive unit is turned off, or lost by accident. This is achieved due to the features that the drive unit is arranged such that the power source is disconnected from the motor when the switches are in their default positions, and the two switches automatically switch back to their default positions when the control power in the drive unit is taken away. Thus, another advantage with the present invention is that it prevents transfer of power from the power source to the motor at a point in time when there is no control power in the drive unit, such as when the control power has been deliberately turned off, or when the control power has been lost by accident. This is important since it is very dangerous to let the main power go to the motor without control power. It can be dangerous to humans since the DC bus voltage can already have built up several hundred volts in a traditional design. For instance, there should be no main power and no control power in the drive unit before the drive unit is powered on.

According to an embodiment of the invention, the first switch is controlled by the control power of the drive unit and is arranged to switch to the default position when there is no control power in the drive unit, and to switch to an engaged position when there is control power in the drive unit. The first switch is only controlled by the existence of control power. The switch will always be in its engaged position when there is control power in the drive unit, since there is no other control signal that is used to control the first switch. The drive unit is arranged such that the power source is connected when the first switch is in the engaged position. The functions of the first switch is to ensure that the main power is immediately turned off when there is no control power in the drive unit and together with the second switch provide a quick discharge of the energy storage when the control power is removed.

According to an embodiment of the invention, the first switch is a relay including a coil. The relay is arranged such that current will go through the coil and engage the relay when there is control power in the drive unit, and the relay will switch back to the default position when the control power is off. To use a relay as the switch is advantageous since a relay always switches back to its default position when the control power to the relay is turned off. Thus, the use of a relay increases the safety.

According to an embodiment of the invention, the drive unit further comprises a frequency inverter arranged to convert the direct current from the power source to a variable alternating current for the motor, and a DC bus for transferring the direct current from the power source to the inverter, the DC bus comprising said energy storage, said discharge circuit and said first and second switches. The drive unit is arranged such that the power source is supplying current to the inverter when the first switch is in the engaged position, and the power supply to the inverter is disconnected when the first switch is in the default position. This feature is important since it can be dangerous to supply main power to the inverter without control power to the DC bus.

According to an embodiment of the invention, the second switch is controlled by a control signal, the drive unit comprises a control unit configured to generate said control signal, and the second switch is configured to switch to the default position when there is no control power in the drive unit, or the control signal commands switching to the default position, and to switch to an engaged position when there is control power in the drive unit, and accordingly in the DC bus, and the control signal commands switching to the engaged position. When there is control power in the drive unit it is possible to move the switch between the default position and the engaged position. The drive unit is arranged so that the energy storage is charged via the power resistor when the second switch is in its default position and the energy storage is charged, but not via the power resistor, when the second switch is in its engaged position. Accordingly, the functions of the second switch is to switch between charging the energy storage via the power resistor and charging the energy storage directly from the power source, and, together with the first switch, provide a quick discharge of the energy storage when the control power is removed. The power resistor of the discharge circuit is used for both the charging and the discharging of the capacitor.

According to an embodiment of the invention, the drive unit is adapted, during start-up of the drive unit, to lead an inrush current through said power resistor, and the drive unit is arranged such that the inrush current is led through the power resistor when the first switch is in its engaged position and the second switch is in its default position. The control unit is configured to order the second switch to stay in its default position during start-up of the drive unit. The same resistor is used to take care of the inrush current during start-up of the drive unit, and to discharge the energy storage when the voltage across the energy storage becomes too high during normal operation. By "during start-up of the drive unit" is meant from the point in time the power to the drive unit is turned on until the energy storage is fully or almost fully charged.

According to an embodiment of the invention, the control unit is configured to order the second switch to switch to its engaged position after start-up of the drive unit and to stay in its engaged position during normal operation of the drive unit. During normal operation, the current is supplied directly to the energy storage, and not via the power resistor in order to avoid power losses.

According to an embodiment of the invention, the discharge circuit comprises a third switch arranged, upon command, to discharge the energy storage during normal operation by means of said power resistor. Thus, the energy storage is discharge when the voltage across the energy storage becomes too high during normal operation.

According to an embodiment of the invention, said drive unit is a drive unit for an industrial robot, and said dc source is a rectifier converting alternating current into direct current for at least one of the motors of the robot. The invention is particularly useful for a drive unit of an industrial robot.

The invention is useful for both low- and high-voltage power sources. The power source is, for example, a rectifier converting alternating current to direct current. However, the power source can also be a battery or a DC generator.

BRIEF DESCRIPTION OF THE DRAWINGS

The invention will now be explained more closely by the description of an embodiment of the invention and with reference to the appended figures.

DETAILED DESCRIPTION OF PREFERRED EMBODIMENTS OF THE INVENTION

Figure 1:
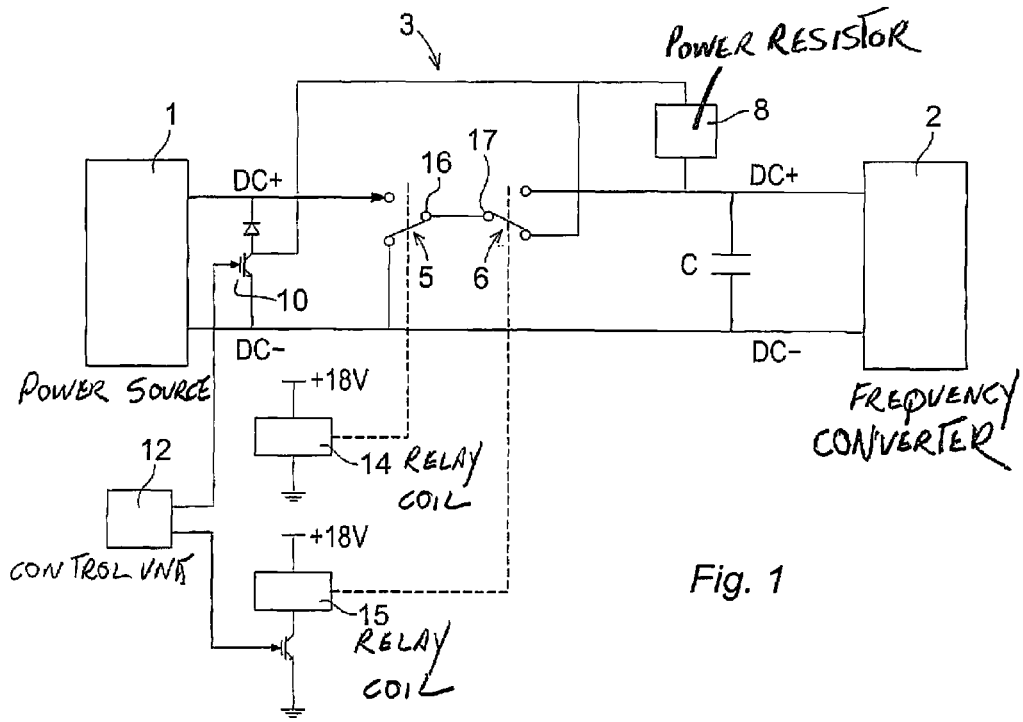
FIG. 1 shows a drive unit according to an embodiment of the invention in a default state.

FIG. 1 shows a principal circuit scheme for a drive unit according to an embodiment of the invention. The drive unit is intended to be used in an industrial robot drive. However, the invention is not limited to drive units for industrial robots. For example, the drive unit of the invention can be used for an AC servo drive, a servo motor inverter, or a high voltage AC/DC power source.

The drive unit comprises a control power supply (not shown) for supplying the electronic devices of the drive unit, such as transistors, diodes, capacitors, IGBT gate drivers with control power. In this embodiment the control power is 18 V. The drive unit comprises a power source 1 for producing current to the motor. In this embodiment the power source is a rectifier receiving alternating current and adapted to convert the alternating current into a direct current. For example, the rectifier can be a three-phase bridge that converts three phases of alternating current into direct current. However, the invention is also applicable to a rectifier converting one or two phases into direct current. The rectifier 1 has a positive and a negative DC output. In another embodiment, the power source could be a DC power source.

In this embodiment the drive unit comprises a frequency converter 2 for converting the DC current from the rectifier 1 to a variable alternating current in dependence on reference values generated based on a control program. The variable alternating current from the frequency converter 2 is then supplied to the motor. The drive unit further comprises a DC bus 3 for transferring the direct current from the rectifier 1 to the frequency inverter 2. The DC bus 3 is provided with energy storage, in the form of a capacitor C, arranged at the output of the rectifier 1, and accordingly at the input of the inverter 2, for storing energy recovered during braking of the motor. The capacitor C has a positive node connected to the positive DC output of the rectifier 1 via two switches 5, 6, and to the positive input of the inverter 2. The capacitor C has a negative node that is connected to the negative DC output of the rectifier and to the negative input of the inverter. When the motor is electrically braked, energy from the motor is recovered and fed back to the capacitor C. If the energy stored in the capacity C is not consumed, the voltage across the capacitor is increasing and if the voltage becomes too high, the capacitor can be damaged. The capacitor C is normally a large aluminium electrolytic capacitor and the capacitance is, for example, 100-3000 µF. In an alternative embodiment, the capacitor C can be changed to another component that stores electrical energy, such as a rechargeable battery, for instance a lead accumulator.

In order to avoid damaging of the capacitor, a discharge circuit is provided for discharging the capacitor if the voltage across a capacitor becomes too high. The discharge circuit includes a power resistor 8, a so-called bleeder resistor, and a brake control switch 10. One end of the power resistor 8 is connected to the switch 6 and to the brake control switch 10 and the other end is connected to the capacitor C and the positive input of the inverter 2. The size of the power resistor 8 depends on how much energy must be recovered from the motors during braking.

The resistor must be selected such that it can take care of all the required energy. The resistor is, for example, 1-50 ohms. In this embodiment the brake control switch 10 is a brake chopper. The brake control switch 10 can be several types of electric valves, for example, a MOSFET transistor or a relay, typically an IGBT. Alternatively, the brake control switch 10 can be a relay or any other type of controllable electric switch. The power resistor 8 is arranged in parallel with the capacitor C via the brake control switch 10. The switch 6 is also a part of the discharge circuit. When the brake chopper 10 is turned on and the second switch 6 is in its engaged position, the power resistor is connected in parallel with the capacitor C and the capacitor is discharged. When the brake chopper 10 is turned off and the second switch is still in its engaged position, the resistor is disconnected from the capacitor C and no discharging can take place through the resistor.

The switch 5 is arranged such that when it is in a default position the current from the power source is disconnected. The switches 5,6 are arranged such that the energy storage C is discharged via the power resistor 8 when the switches 5,6 are in default positions. The switches 5,6 are controlled by the control power of the drive unit such that the they are in their default positions when there is control power in the drive unit.

The drive unit further includes a control unit 12 controlling the turning on and off of the brake chopper 10 and the switching of the switch 6. The voltage across the capacitor C is measured and the measured values are sent to the control unit 12 that compares received voltage values with a lower and an upper limit value. If it is detected that the voltage across the capacitor exceeds the upper limit, the brake chopper is turned on and thereby the power resistor 8 is connected to the capacitor C and the capacitor is discharged. When the control unit detects that the voltage across the capacitor is below the lower limit, the brake chopper is turned off and thereby the power resistor is disconnected from the capacitor and the discharging of the capacitor stops.

The switches 5, 6 are used to control the connection and disconnection of the DC bus and the charge and discharge of the capacitor C. In this embodiment the switches 5, 6 are relays including relay coils 14, 15. Alternatively, other types of switches can be used, for example power transistors. The control power in the drive unit is used to control on/off of the relays. In this example the control power is +18V. The first relay 5 is only controlled by the existence and non-existence of control power. The relay 5 is arranged such that it will be engaged when there is control power in the system. This is because there is no other control signal which is used to control the relay 5. The current will go through the coil 14 of the relay 5 and engages the relay 5 when there is control power. The relay will switch back to its default position when the control power is power off or loss by accident. The switching on/off of relay 6 is controlled by the control signal from the control unit 12. The control power also needs to be there in order to move the relay to its engaged position.

The switch 5 comprises a common node 16 and the switch 6 comprises a common node 17. The common node 16 of the switch 5 is connected to the common node 17 of the switch 6. The switch 5 is arranged to switch between a default position, in which the common node 16 is connected to the negative DC output of the rectifier 1, and an engaged position, in which the common node 16 is connected to the positive DC output from the rectifier 1. The switch 5 is controlled by the control power of the DC bus in such a manner that the switch 5 is in the default position when there is no control power to the drive unit and the switch 5 is in the engaged position when there is control power in the drive unit. The switch 6 is arranged to switch between a default position in which the switch 6 is connected to the power resistor 8, and an engaged position in which the switch 6 is connected to the positive DC input of the inverter 2.

FIG. 1 shows the drive unit in a default state, in which the control power is off or loss by accident. The two switches 5, 6 are in their default positions. When the switch 5 is in its default position, the power to the inverter is disconnected and accordingly there is no power in the DC bus. This is the state before the drive unit is powered on. There should be no main power and no control power during this state. In this state both switches 5, 6 are in their default positions due to the fact that there is no control power in the drive unit. As shown from the figure, the main power from the rectifier 1 can not go to the inverter 2 in this situation. This feature is useful because it is very dangerous to let the main power go to the inverter without any control power in the drive unit.

Figure 2:
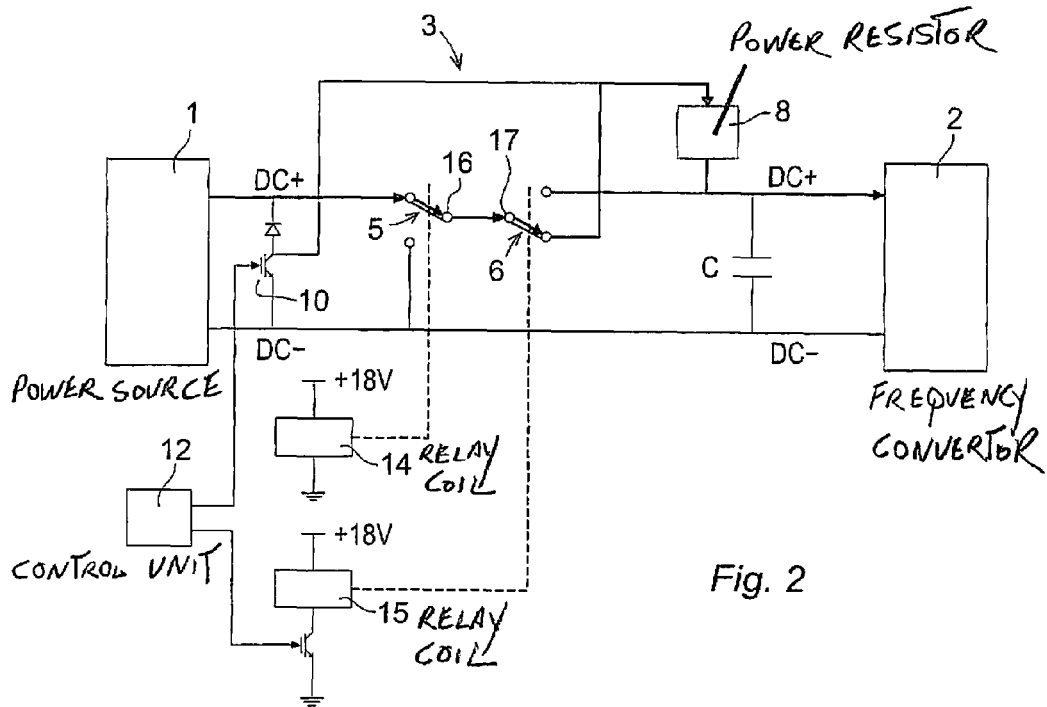
FIG. 2 shows the drive unit of FIG. 1 in a charging state.

FIG. 2 shows the drive unit in a charging state. The drive unit is put in the charging state during the DC-bus charging period. A problem upon start-up of the drive unit is that a large inrush current is generated when the power supply to the rectifier is turned on, and accordingly during the charging state. The capacitance of the capacitor C is too large to let the charging current from the rectifier directly charge the capacitor without the power resistor 8 in between. Both the rectifier 1 and the capacitor C run the risk of being destroyed if the capacitor C is charged directly without going through the power resistor. During the charging state the switch 5 is in its engaged position due to the fact that there is control power in the drive unit, and the switch 6 is in its default position upon order from the control unit. When the switches 5, 6 are such positioned, the current from the rectifier will go through the power resistor 8 to the capacitor C and to the positive input of the inverter 2. The current will go through the path shown in the figure to charge the capacitor C until the capacitor rises up to a voltage level which is in balance with the incoming main voltage. The control power has to be there in order to have the proper switch positions during the charging state. The switch 5 will be engaged when the control power exists. The switch 6 will be controlled from the control unit 12 to the default position during the charging state so that the charging current can go through the power resistor 8 to the capacitor C.

Figure 3:
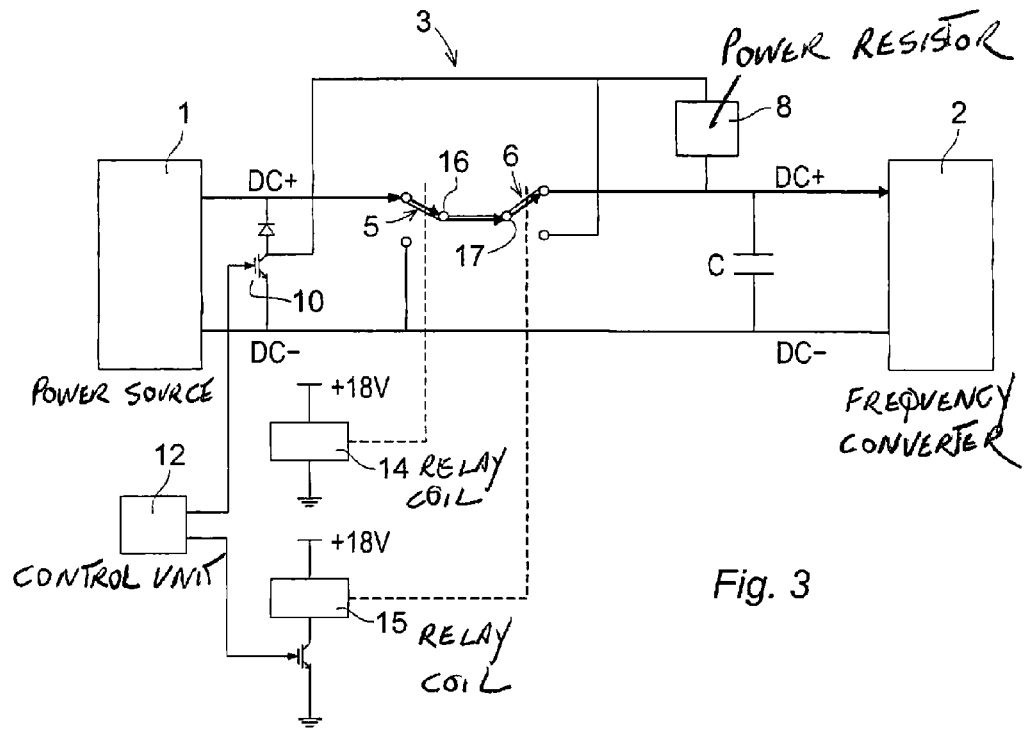
FIG. 3 shows the drive unit of FIG. 1 in a working state.

FIG. 3 shows the drive unit and the position of the switches 5, 6 during a working state, i.e. during normal operation of the drive unit. In this state the voltage level of the DC bus is already balanced with the incoming main voltage. The switch 5 is in its engaged position due to the fact that there exists control power in the drive unit. The switch 6 has been switched to its engaged position by the control signal from the control unit 12 after the charging state. The current from the rectifier is supplied directly to the inverter, without passing through the power resistor, as shown in the figure. Since there is no need of any high current to charge the DC bus capacitor in this state, it is not necessary to have the power resistor on the working current flow path.

Figure 4:
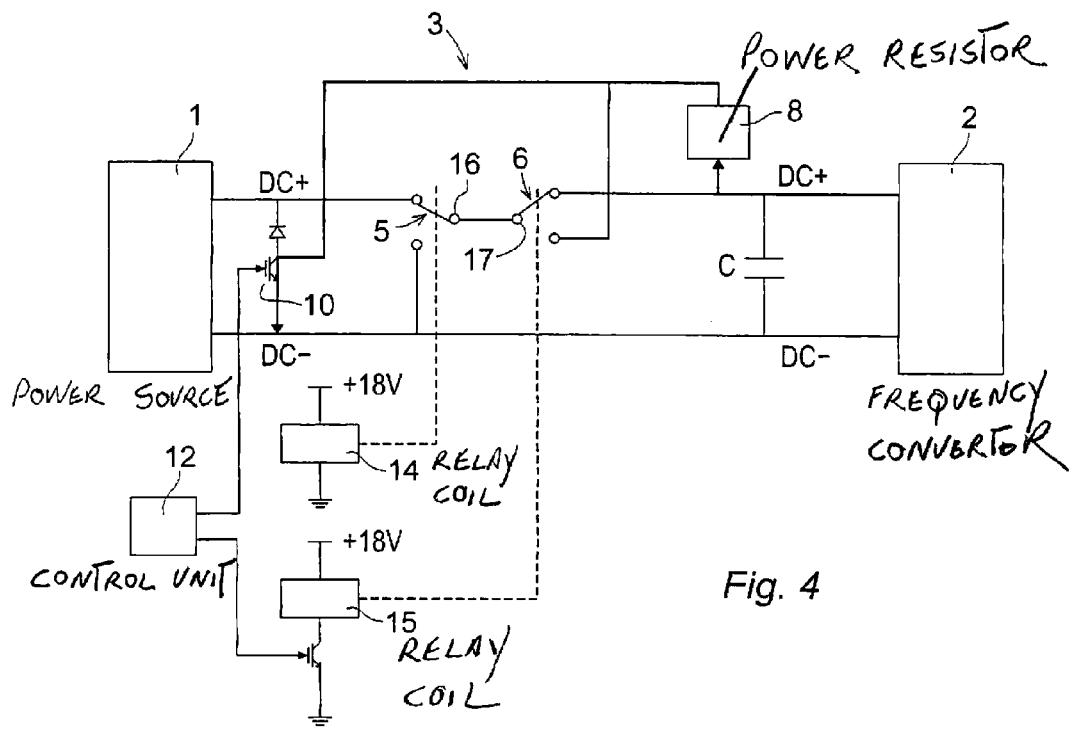
FIG. 4 shows the drive unit of FIG. 1 in a braking state.

FIG. 4 shows the drive unit in a braking state. When the motor is braked, energy from the motor is recovered and fed back to the capacitor C. If this energy is not consumed in another motor, the voltage across the capacitor is increased. The too high DC-bus voltage can be harmful to the capacitor and the inverter. In order to protect the capacitor and other components, it is necessary to discharge the capacitor if the voltage across the capacitor becomes too high. Therefore, the voltage across the capacitor is supervised, and if the voltage rises above a limit value the brake control switch is turned on which means that the capacitor C is connected to the negative DC output of the rectifier via the power resistor 8 and the brake control switch 10, so that the power resistor 8 discharges energy of the capacitor C. When the voltage across the capacitor C is below a limit value, the brake control switch 10 is turned off and accordingly the capacitor is disconnected from the discharging path. In all the previously described states, the brake control switch 10 has been turned off. In the braking state, the switches 5, 6 are in the same positions as shown in the working state shown in FIG. 3, i.e. both switches 5, 6 are in their engaged positions. However, the brake control switch 10 has been opened. The opening and closing of the brake control switch is ordered by a brake control signal from the control unit 12, which decides if it is the time to consume the energy. The extra energy will be consumed by the power resistor 8 through the braking path shown in FIG. 4.

Figure 5:
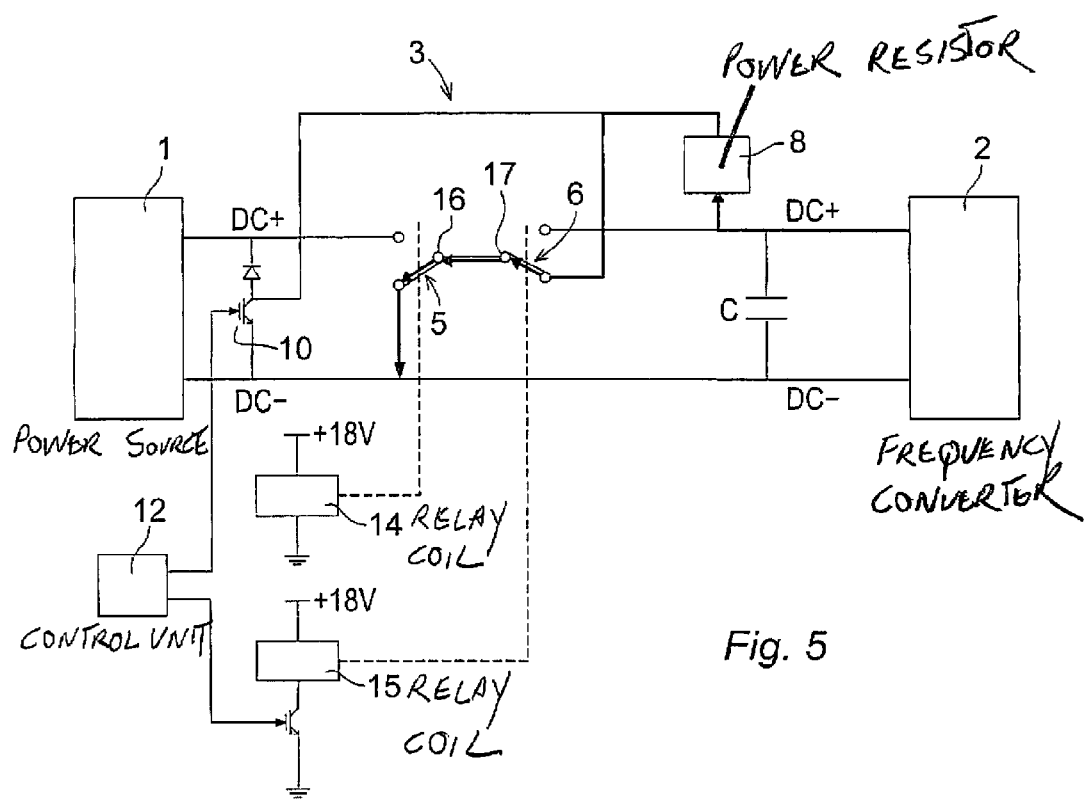
FIG. 5 shows the drive unit of FIG. 1 and in a discharging state.

FIG. 5 shows the drive unit during a discharge state. The DC bus will still have high voltage for quite a long time after the drive unit has stopped working, due to energy stored in the capacitor C. The high voltage can remain up to several hours without any discharging circuit. This can not be allowed because the high voltage stored in the DC-bus capacitor can injure people. The switches 5,6 are in their default positions since there is not control power in the drive unit. The positions of the switches 5, 6 are the same in this state as in the default state, as shown in FIG. 1. The extra energy stored in the DC-bus capacitor. C will be discharged through the power resistor through the path shown in FIG. 5. The current is led from the capacitor C to the negative DC output from the rectifier via the power resistor 8 and the switches 5,6. This means that the power resistor 8 can be used for both the charging and discharging of the DC-bus capacitor C. This helps to save cost and size because the power resistor is quite large in order to make the charge and discharge time short. The discharge time can be less than 1 second. The switches 5, 6 also help to protect the inverter 2 if the control power is lost by accident during the working state. This is because the main power will be cut off automatically by switch 5 and the DC bus will be discharged through the path shown in FIG. 5. The drive unit will be protected even if control power loss happens.

The present invention is not limited to the embodiments disclosed, but may be varied and modified within the scope of the following claims. For example, the drive unit may include a plurality of inverters and their energy store may include a plurality of capacitors. The control power does not need to be only +18V, it just have to provide power to the relay coils 14, 15 and the switch 10. The relay can be a power transistor, a switch etc.

The invention claimed is:

1. A drive unit comprising:
a control power supply (+18V) for supplying the drive unit with control power,
a power source (1) producing direct current to one or more inverters,
at least one inverter (2),
an energy storage (C) arranged at the output of the power source for smoothing the direct current and storing energy recovered during braking, and
a discharge circuit (8,10) including a power resistor (8) for discharging energy stored in said energy storage, wherein the drive unit further comprises a first and a second switch (5,6) arranged between the power source and the energy storage, the switches are arranged such that they are in default positions when there is no control power in the drive unit, the drive unit is configured such that the power source is disconnected and the energy storage is discharged via said power resistor when the switches are in their default positions, and the first switch (5) is controlled by the control power of the drive unit and is arranged to switch to the default position when there is no control power in the drive unit, and an engaged position when there is control power in the drive unit.

2. A drive unit comprising:

a control power supply (+18V) for supplying the drive unit with control power, a power source (1) producing direct current to one or more inverters, at least one inverter (2), an energy storage (C) arranged at the output of the power source for smoothing the direct current and storing energy recovered during braking, and a discharge circuit (8,10) including a power resistor (8) for discharging energy stored in said energy storage, wherein the drive unit further comprises a first and a second switch (5,6) arranged between the power source and the energy storage, the switches are arranged such that they are in default positions when there is no control power in the drive unit, the drive unit is configured such that the power source is disconnected and the energy storage is discharged via said power resistor when the switches are in their default positions, and the drive unit is arranged such that the power source (1) is supplying current to the inverter (2) when the first switch (5) is in the engaged position.

3. A drive unit comprising:

a control power supply (+18V) for supplying the drive unit with control power, a power source (1) producing direct current to one or more inverters, at least one inverter (2), an energy storage (C) arranged at the output of the power source for smoothing the direct current and storing energy recovered during braking, and a discharge circuit (8,10) including a power resistor (8) for discharging energy stored in said energy storage, wherein the drive unit further comprises a first and a second switch (5,6) arranged between the power source and the energy storage, the switches are arranged such that they are in default positions when there is no control power in the drive unit, the drive unit is configured such that the power source is disconnected and the energy storage is discharged via said power resistor when the switches are in their default positions, the first switch (5) is a relay including a coil (14), and the relay is arranged such that current will go through the coil and engage the relay when there is control power in the drive unit, and the relay will switch back to the default position when the control power is off.

4. The drive unit according to claim 1, wherein the inverter (2) is arranged to convert the direct current from the power source (1) to a variable alternating current, and the drive unit comprises a DC bus (3) for transferring the direct current from the power source to the inverter, the DC bus comprising said energy storage (C), said discharge circuit (8) and said first and second switches (5,6).

5. The drive unit according to claim 1, wherein said drive unit is a drive unit for an industrial robot, and said power source is a rectifier (1) converting alternating current into direct current for the robot.

6. The drive unit according to claim 1, wherein the second switch (6) is controlled by a control signal, the drive unit comprises a control unit (12) configured to generate said control signal, and the second switch (6) is configured to switch to the default position when there is no control power in the drive unit or the control signal commands switching to the default position, and an engaged position when there is control power in the drive unit and the control signal commands switching to the engaged position.

7. The drive unit according to claim 6, wherein the drive unit is arranged such that the power source (1) is charging said energy storage (2) via said power resistor (8) when the first switch (5) is in the engaged position and the second switch (6) is in the default position.

8. The drive unit according to claim 1, wherein the drive unit is adapted, during start-up of the drive unit, to lead an inrush current through said power resistor (8), and the drive unit is arranged such that the inrush current is led through the power resistor when the first switch (5) is in its engaged position and the second switch (6) is in its default position.

9. The drive unit according to claim 1, wherein the control unit is configured to order the second switch (6) to stay in its default position during start-up of the drive unit.

10. The drive unit according to claim 6, wherein the control unit is configured to order the second switch (6) to switch to its engaged position after start-up of the drive unit.

11. The drive unit according to claim 1, wherein the discharge circuit (C) comprises a third switch (10) arranged, upon command, to discharge the energy storage during normal operation by said power resistor (8).

12. The drive unit according to claim 6, wherein the second switch (6) is a relay including a coil (15), the relay is arranged such that current will go through the coil and engage the relay when there is control power in the drive unit and the control signal commands switching to the engaged position, and no current will go through the coil and the relay will switch back to the default position when the control power is off or the control signal commands switching to the default position.

* * * * *